(12) United States Patent
Wu

(10) Patent No.: US 11,585,072 B2
(45) Date of Patent: Feb. 21, 2023

(54) SYSTEM AND METHOD FOR ESTIMATING THE WEIGHT OF A LOAD CARRIED BY AN IMPLEMENT OF A WORK VEHICLE

(71) Applicant: CNH Industrial America LLC, New Holland, PA (US)

(72) Inventor: Duqiang Wu, Bolingbrook, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 293 days.

(21) Appl. No.: 17/091,226

(22) Filed: Nov. 6, 2020

(65) Prior Publication Data
US 2022/0145591 A1    May 12, 2022

(51) Int. Cl.
*E02F 9/26*    (2006.01)
*G01G 19/08*    (2006.01)
(Continued)

(52) U.S. Cl.
CPC ............... *E02F 9/26* (2013.01); *E02F 3/283* (2013.01); *E02F 3/34* (2013.01); *G01B 21/22* (2013.01); *G01C 9/02* (2013.01); *G01G 5/04* (2013.01); *G01G 19/08* (2013.01); *G01K 13/00* (2013.01); *G01P 3/64* (2013.01); *E02F 3/342* (2013.01); *E02F 3/3417* (2013.01); *E02F 9/205* (2013.01); *E02F 9/2203* (2013.01); *E02F 9/2296* (2013.01)

(58) Field of Classification Search
CPC . E02F 3/283; E02F 3/34; E02F 3/3417; E02F 3/342; E02F 9/205; E02F 9/2203; E02F 9/2296; E02F 9/26; E02F 9/264; G01B 21/22; G01C 9/02; G01G 19/08; G01G 5/04; G01K 13/00; G01P 3/64

See application file for complete search history.

(56) References Cited

U.S. PATENT DOCUMENTS

| | | | | |
|---|---|---|---|---|
| 5,509,293 A | * | 4/1996 | Karumanchi | G01G 19/10 73/1.13 |
| 6,518,519 B1 | * | 2/2003 | Crane, III | E02F 9/264 177/136 |

(Continued)

FOREIGN PATENT DOCUMENTS

| | | |
|---|---|---|
| DE | 3220143 C2 | 11/1990 |
| IN | 0107/KOL/2014 A | 1/2016 |

(Continued)

*Primary Examiner* — Tyler J Lee
(74) *Attorney, Agent, or Firm* — Rickard DeMille; Rebecca Henkel

(57) ABSTRACT

A method for estimating load weights for a work vehicle including a boom pivotably coupled to the chassis of the work vehicle at a boom joint and an implement pivotably coupled to the boom at an implement joint may include receiving an input indicative of a tilt force associated with a tilt cylinder configured to pivot the implement about the implement joint, and an input indicative of a lift force associated with a lift cylinder configured to pivot the boom about the boom joint. The method may further include determining a torque about the implement joint caused by the load based on the tilt force and determining a torque about the boom joint caused by the load based on the lift and tilt forces. Additionally, the method may include estimating a weight of the load based on the torques about the boom and implement joints.

20 Claims, 5 Drawing Sheets

(51) Int. Cl.
*G01P 3/64* (2006.01)
*G01G 5/04* (2006.01)
*E02F 3/34* (2006.01)
*E02F 3/28* (2006.01)
*G01B 21/22* (2006.01)
*G01K 13/00* (2021.01)
*G01C 9/02* (2006.01)
*E02F 9/22* (2006.01)
*E02F 9/20* (2006.01)
*E02F 3/342* (2006.01)

(56) References Cited

U.S. PATENT DOCUMENTS

| | | | | |
|---|---|---|---|---|
| 9,200,432 | B1* | 12/2015 | Shatters | E02F 9/264 |
| 9,938,692 | B2 | 4/2018 | Shatters et al. | |
| 11,174,618 | B2* | 11/2021 | Currier | E02F 3/434 |
| 11,214,943 | B2* | 1/2022 | Yamanobe | E02F 9/264 |
| 11,286,648 | B2* | 3/2022 | Zimmerman | G01G 19/12 |
| 2006/0100808 | A1* | 5/2006 | Lueschow | G01G 19/10 |
| | | | | 702/101 |
| 2008/0169131 | A1 | 7/2008 | Takeda et al. | |
| 2014/0167971 | A1* | 6/2014 | Stanley | E02F 9/2296 |
| | | | | 340/666 |
| 2015/0354177 | A1* | 12/2015 | Shatters | E02F 3/422 |
| | | | | 414/815 |
| 2017/0131134 | A1 | 5/2017 | Kang | |

FOREIGN PATENT DOCUMENTS

| | | |
|---|---|---|
| JP | S5984119 A | 5/1984 |
| WO | WO 2007/112718 A1 | 10/2007 |
| WO | WO 2019/065391 A1 | 4/2019 |

* cited by examiner

SYSTEM AND METHOD FOR ESTIMATING THE WEIGHT OF A LOAD CARRIED BY AN IMPLEMENT OF A WORK VEHICLE

FIELD OF THE INVENTION

The present disclosure relates generally to work vehicles and, more particularly, to a system and method for estimating the weight of a load carried by an implement associated with a work vehicle.

BACKGROUND OF THE INVENTION

Work vehicles having loader arms or booms, such as wheel loaders, skid steer loaders, and the like, are a mainstay of construction work and industry. For example, wheel loaders typically include a boom pivotably coupled to the vehicle's chassis that can be raised and lowered at the operator's command. The boom typically has an implement attached to its end, thereby allowing the implement to be moved relative to the ground as the boom is raised and lowered. For example, a bucket is often coupled to the boom, which allows the wheel loader to be used to carry supplies or particulate matter, such as gravel, sand, or dirt, around a worksite or to transfer such supplies or matter to an adjacent transport vehicle (e.g., a truck or railroad car).

When using a work vehicle to perform a material moving operation, it is often desirable to have an accurate estimate of the load weight being carried by the bucket or other implement. For instance, when transferring materials to a transport vehicle, load weight estimates may be used to determine how much material has been loaded onto the transport vehicle to ensure that its load capacity is not exceeded. In this regard, several systems have been developed that attempt to estimate the load weight being carried by within a bucket. However, to date, such systems lack the accuracy and/or reliability typically desired by operators of commercial work vehicles.

Accordingly, an improved system and method for estimating the weight of a load carried by an implement of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for estimating load weights for a work vehicle, where the work vehicle includes a lift assembly and a chassis, the lift assembly including a boom pivotably coupled to the chassis at a boom joint and an implement pivotably coupled to the boom at an implement joint. The method includes controlling, with one or more computing devices, an operation of the lift assembly to move a load supported by the implement. The method further includes receiving, with the one or more computing devices, an input indicative of a tilt force associated with a tilt cylinder configured to pivot the implement relative to the boom about the implement joint, and an input indicative of a lift force associated with a lift cylinder configured to pivot the boom relative to the chassis about the boom joint. Further, the method includes determining, with the one or more computing devices, a torque about the implement joint caused by the load based at least in part on the tilt force. Moreover, the method includes determining, with the one or more computing devices, a torque about the boom joint caused by the load based at least in part on the lift force and the tilt force. Additionally, the method includes estimating, with the one or more computing devices, a weight of the load based at least in part on the torque about the boom joint and the torque about the implement joint.

In another aspect, the present subject matter is directed to a system for estimating the weight of loads carried by implements associated with work vehicles. The system includes a work vehicle including a chassis, a lift assembly including a boom pivotably coupled to the chassis at a boom joint and an implement pivotably coupled to the boom at an implement joint, and a controller including a processor and associated memory. The memory stores instructions, that when implemented by the processor, configure the controller to control an operation of the lift assembly to move a load supported by the implement. The controller is further configured to receive an input indicative of a tilt force associated with a tilt cylinder configured to pivot the implement relative to the boom about the implement joint, and an input indicative of a lift force associated with a lift cylinder configured to pivot the boom relative to the chassis about the boom joint. Further, the controller is configured to determine a torque about the implement joint caused by the load based at least in part on the tilt force. Moreover, the controller is configured to determine a torque about the boom joint caused by the load based at least in part on the lift force and the tilt force. Additionally, the controller is configured to estimate a weight of the load based at least in part on the torque about the boom joint and the torque about the implement joint.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
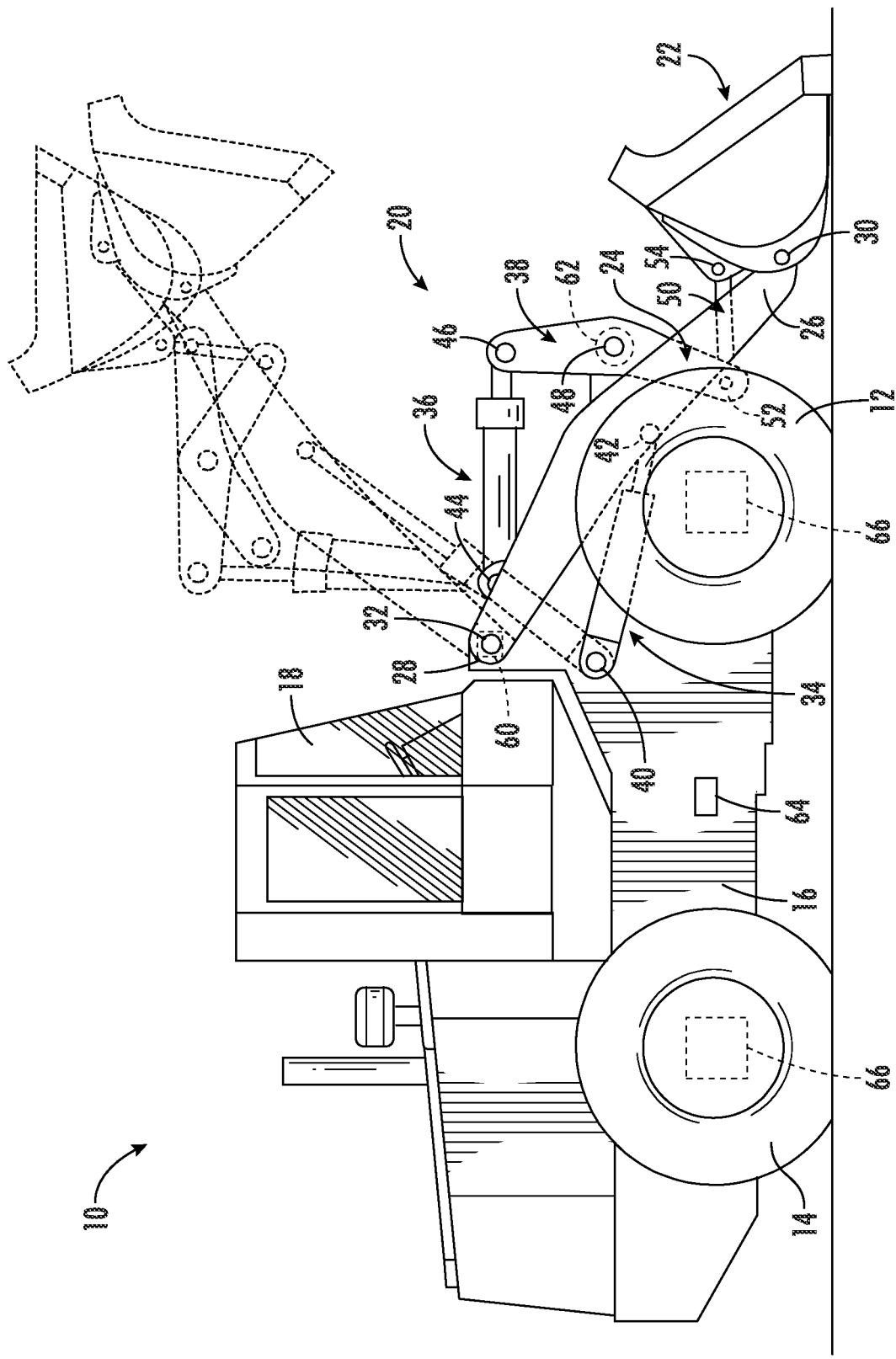
FIG. 1 illustrates a side view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for estimating the weight of a load carried by an implement associated with a work vehicle. In particular, a system and method are disclosed that allow for the implement load weight to be more accurately estimated by taking into account the location of a center of gravity of the load relative to an implement pivot joint before estimating the weight of the load. While lifting loads with the implement, different loads may have different centers of gravity, or the loads may shift during operation of the work vehicle causing the centers of gravity to move. If the changes in the center of gravity, particularly in the direction of travel of the work vehicle, are not accounted for, significant errors may occur in determining the weight of the load. For instance, when a center of gravity of a load is further from a boom pivot joint during a first weighing operating than during a second weighing operation, the perceived weight of the load during the first weighing operation is larger than during the second weighing operation, even though the load is unchanged.

Accordingly, in several embodiments, the disclosed system and method initially determine a torque caused by the load about the implement joint. However, as the weight of the load and the actual distance between the center of gravity of the load and the implement joint are both unknown, the torque about the implement joint caused by the load is equated to a torque about the implement joint caused by a tilt force of the tilt cylinder. Further, a torque about the boom joint caused by the load is also determined. Again, as the weight of the load and the actual distance between the center of gravity of the load and the boom joint are unknown, the torque about the boom joint is equated to a torque about the boom joint caused by a tilt force of the tilt cylinder and a lift force of the lift cylinder. Then, the weight of the load may be estimated based at least in part on the torques caused by the load about the implement joint and the boom joint.

Additionally, the disclosed system and method may also take into account a boom lift angle, an implement tilt angle, and an angle of the chassis when determining the torques about the implement and boom joints. Particularly, by accounting for the different angles, the torque distances may be more accurately determined, which leads to increased accuracy in the determination of the torques about the implement and boom joints.

Referring now to the drawings, FIG. 1 illustrates a side view of one embodiment of a work vehicle 10 in accordance with aspects of the present subject matter. As shown, the work vehicle 10 is configured as a wheel loader. However, in other embodiments, the work vehicle 10 may be configured as any other suitable work vehicle that includes a lift assembly for adjusting the position of an associated implement, such as a skid steer loader, a backhoe loader, a compact track loader and/or the like.

As shown, the work vehicle 10 includes a pair of front wheels 12, (one of which is shown), a pair of rear wheels 14 (one of which is shown), and a frame or chassis 16 coupled to and supported by the wheels 12, 14. An operator's cab 18 may be supported by a portion of the chassis 16 and may house various input devices for permitting an operator to control the operation of the work vehicle 10.

Moreover, as shown in FIG. 1, the work vehicle 10 may include a lift assembly 20 for raising and lowering a suitable implement 22 (e.g., a bucket) relative to a driving surface of the vehicle 10. In several embodiments, the lift assembly 20 may include a boom 24 (e.g., including one or more loader or boom arms) pivotably coupled between the chassis 16 and the implement 22. For example, as shown in FIG. 1, the boom 24 may include a forward end 26 and an aft end 28, with the forward end 26 being pivotably coupled to the implement 22 at a forward pivot point 30 and the aft end 28 being pivotably coupled to a portion of the chassis 16 at a rear pivot point 32.

In addition, the lift assembly 20 may also include one or more boom cylinders 34 coupled between the chassis 16 and the boom 24 and one or more tilt cylinders 36 coupled between the chassis 16 and the implement 22 (e.g., via a mechanical linkage) to allow the implement 22 to be raised/lowered and/or pivoted relative to the driving surface of the work vehicle 10. For instance, the lift cylinder(s) 34 is rotatably coupled to the chassis 16 about a first lift cylinder joint 40 and rotatably coupled to the boom 24 about a second lift cylinder joint 42. The lift cylinder(s) 34 may be extended and retracted in order to pivot the boom 24 about the boom joint 32 upward and downwards, respectively, thereby at least partially controlling the vertical positioning of the implement 22 relative to the driving surface.

The tilt cylinder(s) 36 is coupled to the implement 22 via a bellcrank assembly including a bellcrank 38 and a connecting linkage 50. For instance, the tilt cylinder(s) 36 is rotatably coupled to the boom 24 by a first tilt cylinder joint 44 and rotatably coupled to the bellcrank 38 by a second tilt cylinder joint 46. The bellcrank 38 is rotatably coupled to the boom 24 by a bellcrank joint 48 and is rotatably coupled to the linkage 50 by a first linkage joint 52, with the first linkage joint 52 being positioned opposite the bellcrank joint 48 from the second tilt cylinder joint 46. The linkage 50 is further rotatably coupled to the implement 22 by a second linkage joint 54. The tilt cylinder(s) 36 may be extended and retracted in order to pivot the implement 22 relative to the boom 24 about the forward pivot point 30, thereby controlling the tilt angle or orientation of the implement 22 relative to the driving surface.

The work vehicle 10 may also include a plurality of sensors for monitoring various operating parameters of the work vehicle 10. For instance, as shown in FIG. 1, the work vehicle 10 may include one or more position sensors for monitoring the position and/or orientation of the boom 24 and/or the implement 22, such as by including a first position sensor 60 provided in operative association with the boom 24 (e.g., at or adjacent to the pivot point 32 for the boom 24) and a second position sensor 62 provided in operative association with the implement 22 (e.g., at or adjacent to a pivot point 30 for the implement 22). The position sensor 60 may also allow the velocity of the boom 24 to be determined by identifying the change in the angular position of the boom 24 over time. Further, as shown, the work vehicle 10 may include one or more inclination sensors configured to monitor the angle of inclination of the work vehicle 10, such as by including a dual-axis inclination sensor 64 mounted to the chassis 16 that is configured to monitor the angle of inclination of the work vehicle 10 in both a pitch direction (e.g., the front-to-back inclination) and a roll direction (e.g., the side-to-side inclination). Moreover, the work vehicle 10 may also include one or more speed sensors 66 for monitoring the speed of the work vehicle 10. Additionally, as will be described with reference to FIG. 2, the work vehicle 10 may further include one or more pressure sensors 128, 130 (FIG. 3) for monitoring the pressure of the hydraulic fluid supplied to the boom lift cylinder(s) 34, one or more pressure sensors 132, 134 (FIG. 3) for monitoring the pressure of the hydraulic fluid supplied to the implement tilt cylinder(s) 36, and/or one or more temperature sensors 136 (FIG. 2) for monitoring the fluid temperature of the hydraulic fluid.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
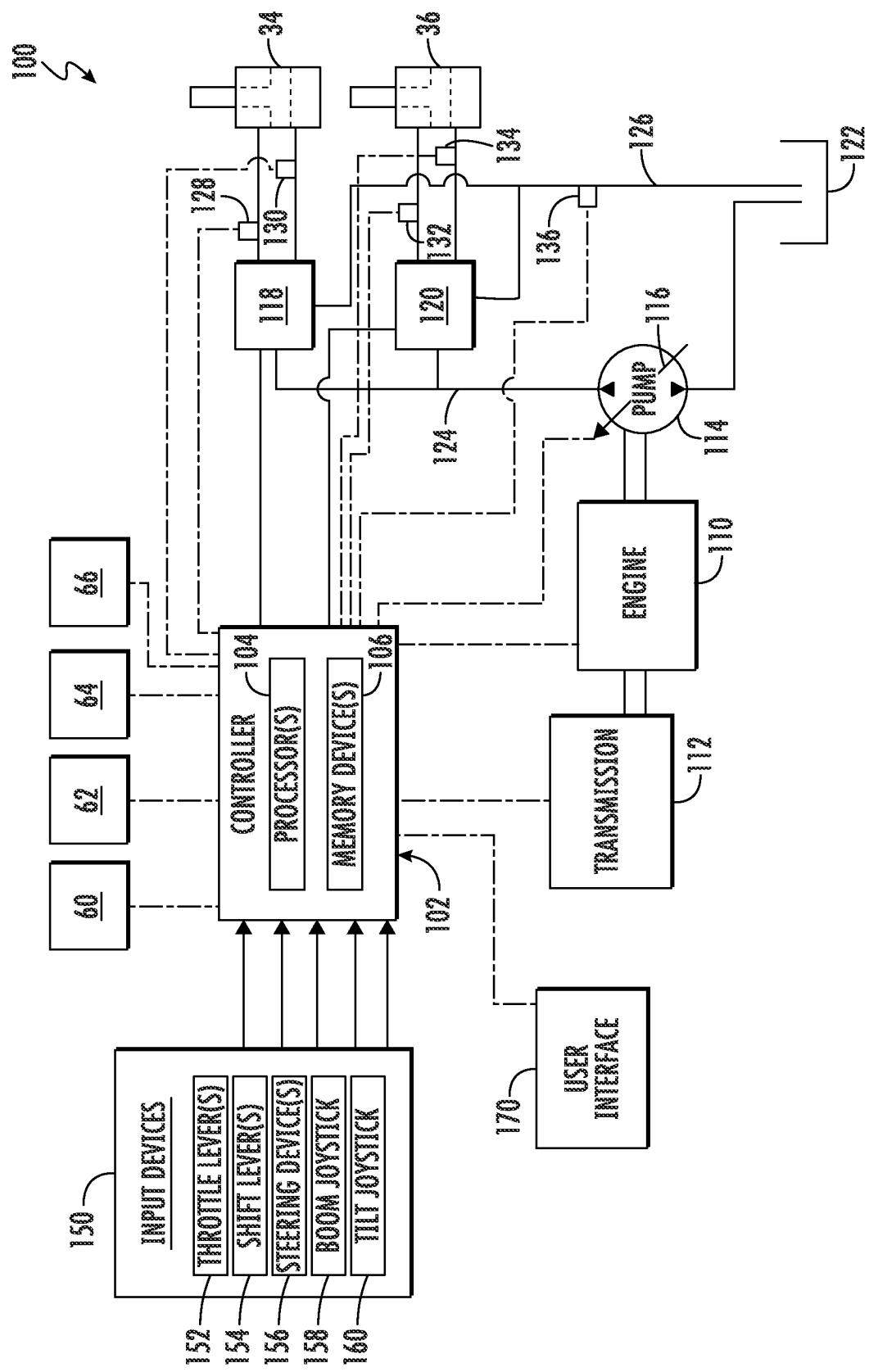
FIG. 2 illustrates a schematic view of one embodiment of a system for estimating the weight of a load carried by an implement of a work vehicle in accordance with aspects of the present subject matter.

Referring now to FIG. 2, a schematic, simplified view of one embodiment of a system 100 for estimating a load weight carried by an implement of a work vehicle is illustrated in accordance with aspects of the present subject matter. In general, the system 100 will be described herein with reference to the work vehicle 10 shown in FIG. 1. However, it should be appreciated that the disclosed system 100 may be utilized with any other suitable work vehicles to allow for the implement load weight to be estimated. It should be appreciated that hydraulic or fluid couplings of the system 100 shown in FIG. 2 are indicated by solid lines. Similarly, communicative links or electrical couplings of the system 100 shown in FIG. 2 are indicated by phantom lines.

As shown in FIG. 2, in several embodiments, the system 100 may include a controller 102. It should be appreciated the controller 102 may generally comprise any suitable processor-based device known in the art, such as one or more computing devices. Thus, in several embodiments, the controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the controller 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store suitable computer-readable instructions that, when implemented by the processor(s) 104, configure the controller 102 to perform various computer-implemented functions, such as performing the various calculations and/or algorithms described herein. In addition, the controller 102 may also include various other suitable components, such as a communications circuit or module, one or more input/output channels, a data/control bus and/or the like.

It should also be appreciated that the controller 102 may correspond to an existing controller of the work vehicle 10 (e.g., an existing engine and/or transmission controller) or the controller 102 may correspond to a separate controller. For instance, in one embodiment, the controller 102 may form all or part of a separate plug-in module that may be installed within the work vehicle 10 to allow for the disclosed system and method to be implemented without requiring additional software to be uploaded onto existing control devices of the vehicle 10.

In several embodiments, the controller 102 may be configured to control the operation of one or more components of the work vehicle 10, such as one or more components of the vehicle's drivetrain and/or the vehicle's lift assembly 20. For example, the controller 102 may be communicatively coupled to one or more components of an engine 110 of the work vehicle 10 (e.g., an engine governor or engine control unit (ECU) (not shown)) via one or more communicative links in order to control and/or monitor the speed and/or torque output of the engine 110. Similarly, the controller 102 may be communicatively coupled to one or more components of a transmission 112 of the work vehicle 10 via one or more communicative links to control the operation of the transmission 112. For instance, the controller 102 may be configured to transmit suitable control commands via a communicative link(s) to one or more clutch valves (not shown) to control the engagement/disengagement of one or more clutches (not shown) of the transmission 112.

Moreover, the controller 102 may also be communicatively coupled to one or more components for controlling the operation of the various cylinders 34, 36 of the lift assembly 20 of the work vehicle 10. For example, in several embodiments, the controller 102 may be coupled to one or more pumps and associated control valves for controlling the flow of hydraulic fluid from a fluid tank of the work vehicle 10 to each cylinder 34, 36. Specifically, as shown in FIG. 2, the lift assembly 20 may include a hydraulic pump 114 driven via an output of the engine 110 and having a swash plate (e.g., indicated by arrow 116) for controlling the supply of hydraulic fluid to the control valves 118, 120 from a fluid tank 122 of the work vehicle 10. In such an embodiment, the controller 102 may be communicatively coupled to the hydraulic pump 114 (e.g., via a communicative link) so that the position or angle of the swash plate 116 of the hydraulic pump 114 may be automatically adjusted to regulate the discharge pressure of the pump 114. In one embodiment, the angle of the swash plate 116 may be adjusted via an associated actuator(s) (not shown) configured to be controlled by the controller 102.

As shown in FIG. 2, the hydraulic pump 114 may be fluidly coupled to control valves, such as one or more boom lift control valves 118 and one or more tilt control valves 120 via one or more fluid lines 124. The boom control valve(s) 118 may generally be configured to regulate the supply of hydraulic fluid to the boom lift cylinder(s) 34 via the fluid lines 124 and the release of hydraulic fluid from the boom lift cylinder(s) 34 via return line 126 to the fluid tank 122, thereby controlling the extension/retraction of the boom lift cylinder(s) 34. Similarly, the tilt control valve(s) 120 may generally be configured to regulate the supply of hydraulic fluid to the tilt cylinder(s) 36 via the fluid lines 124 and the release of hydraulic fluid from the boom lift cylinder(s) 34 via the return line 126 to the fluid tank 122, thereby controlling the extension/retraction of the tilt cylinder(s) 36.

In several embodiments, the control valves 118, 120 may correspond to electrically controlled valves (e.g., solenoid-activated valves) to allow the controller 102 to automatically control the operation of each valve 118, 120. For instance, as shown in FIG. 2, the controller 102 may be communicatively coupled to the control valves 118, 120 via associated communicative links, thereby allowing the controller 102 to regulate the extension/retraction of the associated cylinders 34, 36 via control of the valves 118, 120.

Further, as indicated above, in several embodiments, the system 100 may also include one or more pressure sensors 128, 130 communicatively coupled to the controller 102 (e.g., via communicative links) to allow the controller 102 to monitor the fluid pressure of the hydraulic fluid being supplied to the lift cylinder(s) 34. For instance, as shown in FIG. 2, the controller 102 may be coupled to first and second lift pressure sensors 128, 130 provided in fluid communication with the fluid lines provided between the boom control valve(s) 118 and the boom cylinder(s) 34, with the first lift pressure sensor 128 being configured to monitor the fluid pressure of the hydraulic fluid supplied to the rod-side of the boom cylinder(s) 34 and the second lift pressure sensor 130 being configured to monitor the fluid pressure of the hydraulic fluid supplied to the piston-side or cylinder-side of the boom cylinder(s) 34. Similarly, the system 100 may also include one or more pressure sensors 132, 134 communicatively coupled to the controller 102 (e.g., via communicative links) to allow the controller 102 to monitor the fluid pressure of the hydraulic fluid being supplied to the tilt cylinder(s) 36. For instance, as shown in FIG. 2, the controller 102 may be coupled to first and second tilt pressure sensors 132, 134 provided in fluid communication with the fluid lines provided between the tilt control valve(s) 120 and the tilt cylinder(s) 36, with the first tilt pressure sensor 132 being configured to monitor the fluid pressure of the hydraulic fluid supplied to the rod-side of the tilt cylinder(s) 36 and the second tilt pressure sensor 134 being configured to monitor the fluid pressure of the hydraulic fluid supplied to the piston-side or cylinder-side of the tilt cylinder(s) 36.

It should be appreciated that the controller 102 may also be communicatively coupled to one or more temperature sensors 136 configured to allow the temperature of the hydraulic fluid utilized within the vehicle's hydraulic system to be monitored. For instance, as shown in FIG. 2, the temperature sensor(s) 52 may, in one embodiment, be provided in operative association with a return line 126 for the hydraulic fluid to allow the fluid temperature of the hydraulic fluid being returned to the fluid tank 122 to be monitored.

As indicated above, the controller 102 may also be communicatively coupled to one or more position sensors 60, 62 (e.g., via communicative links) for monitoring the position(s) and/or orientation(s) of the boom 24 and the implement 22. In several embodiments, the position sensor(s) 60, 62 may correspond to one or more angle sensors (e.g., a rotary or shaft encoder(s) or any other suitable angle transducer(s)) configured to monitor the angle or orientation of the boom 24 and/or implement 22 relative to one or more reference points. For instance, in one embodiment, the first angle sensor(s) 60 positioned at the rear pivot point 32 of the boom 24 allows the angular position of the boom 24 relative to the work vehicle 10 to be monitored. Similarly, in one embodiment, the second angle sensor(s) 62 positioned at one of the front pivot points 30 allows the position of the implement 22 relative to the boom 24 to be monitored. In alternative embodiments, the position sensors 60, 62 may correspond to any other suitable sensors that are configured to provide a measurement signal associated with the position and/or orientation of the respective element (e.g., the boom 24 relative to the work vehicle 10, or the implement 22 relative to the boom 24). It should be appreciated that the position sensors 60, 62 may also allow the movement velocity of the boom 24 and the implement 22 to be determined by identifying the change in position of such components over time.

Further, as indicated above, the controller 102 may also be communicatively coupled to one or more inclination sensors 64 (e.g., via communicative link(s)) configured to monitor the angle of inclination of the work vehicle 10. For example, in several embodiments, the inclination sensor(s) 64 may comprise one or more one or more accelerometers, inclinometers, gyroscopes and/or any other suitable inclination sensor(s) configured to monitor the angle of inclination of the work vehicle 10 by measuring its orientation relative to gravity. For instance, as described above with reference to FIG. 1, the inclination sensor(s) 64 may correspond to a dual-axis sensor mounted to a portion of the chassis 16 to allow the sensor(s) 44 to monitor the angle of inclination of the work vehicle 10 in two directions (e.g., the pitch and roll directions of the work vehicle 10). However, in other embodiments, the inclination sensor(s) 44 may be disposed on the work vehicle 10 at any other suitable location.

Referring still to FIG. 2, the controller 102 may also be communicatively coupled to any other suitable sensors configured to monitor one or more operating parameters of the work vehicle 10 and/or its components. For instance, the controller 102 may also be communicatively coupled to the speed sensor(s) 66 to allow the controller 102 to monitor the speed and/or acceleration of the work vehicle 10. For example, in one embodiment, the speed sensor(s) 66 may be any suitable rotational speed sensor positioned at a drive shaft of the engine 110 coupled to one or more of the wheels 12, 14 and allows the rotational speed of the drive shaft to be monitored, which is indicative of the ground speed of the vehicle 10.

The controller 102 may also be communicatively coupled to one or more operator-controlled input devices 150 located within the vehicle's cab 18. As such, the controller 102 may be configured to receive various operator-initiated control commands for controlling the operation of the work vehicle 10. For instance, the controller 102 may be communicatively coupled to an engine throttle lever 152 to allow the controller 102 to receive control signals associated with operator-initiated engine speed commands for adjusting the engine speed of the engine 110. In addition, the controller 102 may be communicatively coupled to a shift lever 154 or other suitable input device configured to allow the operator to transmit control signals associated with operator-initiated shift commands for adjusting the current gear ratio of the transmission 112. Similarly, the controller 102 may be communicatively coupled to a steering device 156 or other suitable input device configured to allow the controller 102 to receive control signals associated with steering commands for adjusting the vehicle's steering angle as the operator manipulates the steering device 156 (e.g., a steering wheel) of the work vehicle 10. Moreover, the controller 102 may be communicatively coupled to one or more boom joysticks 158 for receiving control signals associated with operator-initiated control commands for controlling the movement of the boom 24 (e.g., by controlling the lift cylinder 34 pressure) and/or the one or more tilt joysticks 160 associated with operator-initiated control commands for controlling the movement of the implement 22 (e.g., by controlling the tilt cylinder 36 pressure).

Additionally, the controller 102 may be communicatively coupled to a user interface 170 associated with the work vehicle 10 and the implement 22. In general, the user interface 170 may correspond to any suitable input device(s) configured to allow an operator to provide operator inputs to control the operation of the one or more components of the work vehicle 10 and implement 22. For instance, in one embodiment, the user interface 170 includes one or more of the input devices 150, or any other suitable knob(s), button(s), touch screen display(s), keyboard(s), joystick(s), switch(es), and/or combinations thereof for controlling the operation of the work vehicle and the implement 22. Additionally, the user interface 170 includes various output devices that are controllable by the controller 102 to display or otherwise indicate one or more operating conditions of the work vehicle 10 and the implement 22 to an operator. For instance, the controller 102 may indicate to an operator at least the weight of the load being carried by the implement 22, with the weight of the load being determined as will be described in greater detail below. It should be appreciated that the user interface 170 may include a screen display(s) or any other or additional suitable indicator(s), such as light(s), audio device(s) (e.g., alarm(s), speaker(s), etc.), and/or the like to provide indicators to the operator. It should additionally be appreciated that, in some embodiments, the user interface 170 is housed in the operator's cab 18. However, in other embodiments, the user interface 170 is positioned remotely from the work vehicle 10.

Figure 3:
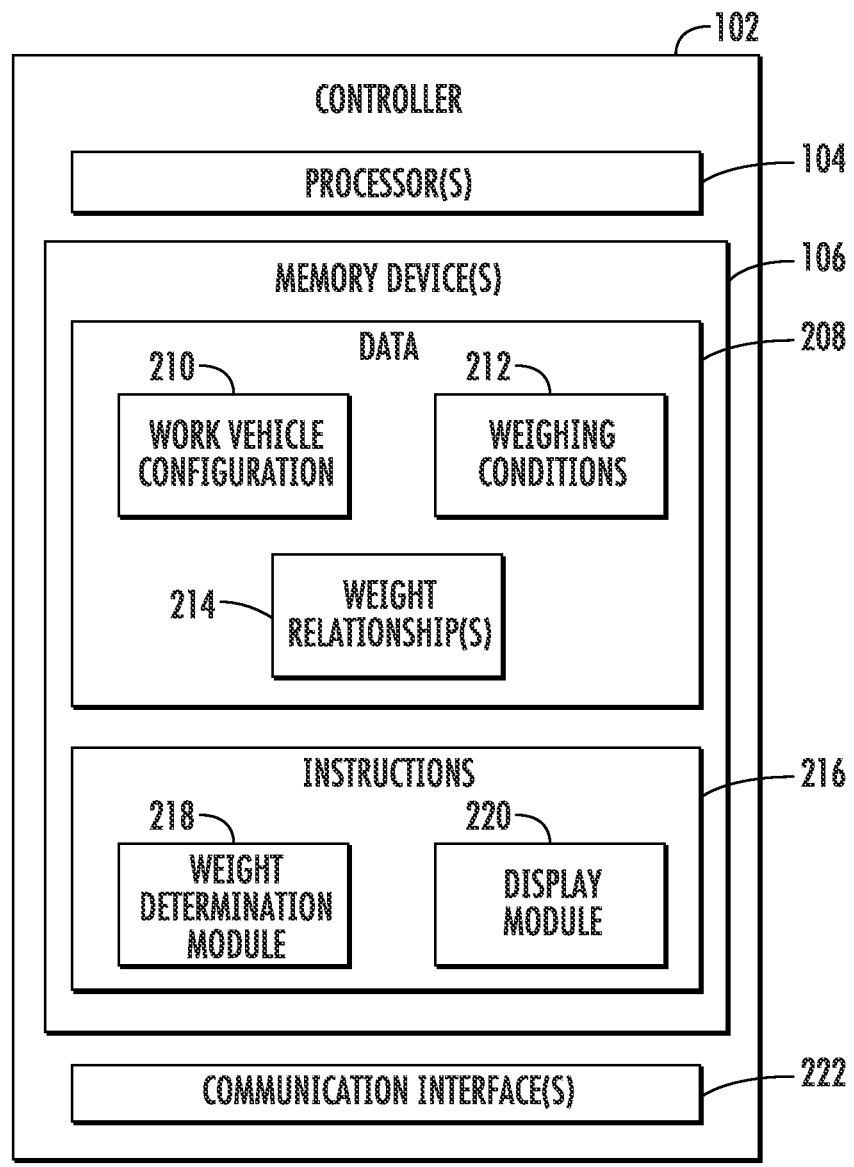
FIG. 3 illustrates a schematic view of one embodiment of a controller suitable for use within a system for estimating the weight of a load carried by an implement of a work vehicle in accordance with aspects of the present subject matter.

Referring now to FIG. 3, a schematic view of one embodiment of a controller 102 suitable for use within a system for estimating a load weight being carried by an implement associated with a work vehicle is illustrated in accordance with aspects of the present subject matter. In general, the controller 102 shown in FIG. 3 will be described with reference to an example implementation of the system components illustrated in FIGS. 1-2, such as the work vehicle 10, the implement 22, the system 100, and related componentry. However, it should be appreciated that, in other embodiments, the controller 102 may be configured for use within any other suitable system configuration or architecture and/or may incorporate any other suitable components and/or combination of components that generally allow the controller 102 to function as described herein.

As indicated above, the controller 102 includes a processor(s) 104 and one or more associated memory device(s) 106. In one embodiment, the memory 106 of the controller 102 may include a work vehicle configuration database 210 for storing data received from any suitable source (e.g., an offsite server, separate database, separate controller, etc.), with the data being indicative of the relative configuration, weights, lengths of various components of the lift assembly 20 and/or relating various monitored operating parameters to different torque arms of the lift assembly 20 and the implement 22. The term "vehicle configuration data" may thus, include any suitable data transmitted to the controller 102 and stored within the work vehicle configuration database 210 for subsequent processing and/or analysis. For instance, one or more lookup tables may be generated and stored in the work vehicle configuration database 210 that indicate the weights of one or more of the particular implement 22, the bellcrank assembly 38, 50, the boom 24, and/or the like, that indicate the position of the center of gravity (not shown) of the implement 22 when empty, and that correlate various monitored operating parameters (e.g., boom position, implement tilt position, chassis angle) to torque arm distances between various components of the lift assembly 20 and the implement 22. Alternatively, or additionally, it should also be appreciated that, in one embodiment, suitable mathematical models or other stored relationships may be stored in the work vehicle configuration database 210 and used for example, for determining the torque arms as a function of the monitored parameters.

Figure 4:
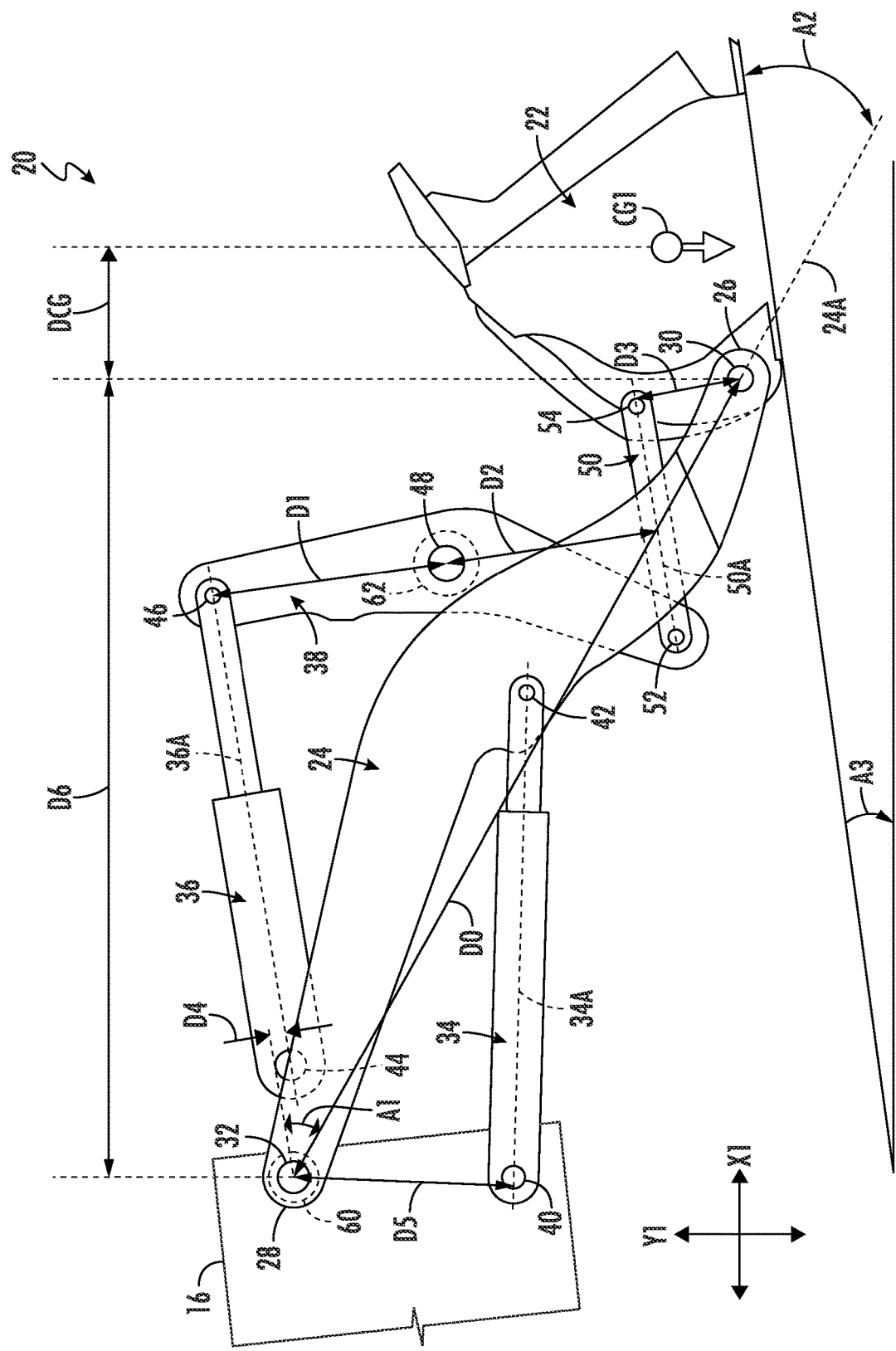
FIG. 4 illustrates a side view of a lift assembly suitable for use with a work vehicle in accordance with aspects of the present subject matter.

Referring briefly to FIG. 4, a side view of the lift assembly 20 described above with reference to FIG. 1 is in accordance with aspects of the present subject matter, particularly illustrating various torque distances associated with the lift assembly 20. As will be described in greater detail below, relevant torque distances D1, D2, D3, D4, D5, D6 associated with the lift assembly 22 may be determined as a function of one or more of boom position, implement tilt position, and chassis angle, and may be used to determine different torques about the implement and boom joints 30, 32. The different torque distances may be pre-determined for different combinations of boom position, implement tilt position, and chassis angle for the particular vehicle configuration and stored in one or more lookup tables of the work vehicle configuration database 210 (FIG. 3). For instance, one or more lookup tables stored in the work vehicle configuration database 210 (FIG. 3) may include different torque arm lengths based at least in part on different combinations of boom position and implement tilt position for a first torque distance D1, a second torque distance D2, a third torque distance D3, a fourth torque distance D4, and a fifth torque distance D5.

As shown in FIG. 4, the first, second, and third torque distances D1, D2, D3 are torque distances associated with the bellcrank assembly 38, 50. The first torque distance D1 is the perpendicular distance between the bellcrank joint 48 and an axis 36A of the tilt cylinder 36, the second torque distance D2 is the perpendicular distance between the bellcrank joint 48 and an axis 50A of the linkage 50, and the third torque distance D3 is the perpendicular distance between the implement joint 30 and the axis 50A of the linkage 50. The first, second, and third torque distances D1, D2, D3 are each defined along an axis or plane extending perpendicular to the axis 36A of the tilt cylinder 36, and thus perpendicular to a tilt force generated by the tilt cylinder 36. Similarly, the fourth torque distance D4 is the perpendicular distance between the boom joint 32 and the axis 36A of the tilt cylinder 36, and the fifth torque distance D5 is the perpendicular distance between the boom joint 32 and an axis 34A of the lift cylinder 34. In one embodiment, one or more lookup tables stored within the configuration database 210 (FIG. 3) may include different values based at least in part on different combinations of boom position, implement tilt position, and chassis angle for a sixth torque distance D6, with the sixth torque distance D6 being a horizontal component of the distance D0 between the implement joint 30 and the boom joint 32 (e.g., in a horizontal direction X1), with D0 being a given distance for the lift assembly configuration stored in the database 210.

As indicated above, as alternative to look-up tables, the work vehicle configuration database 210 (FIG. 3) may otherwise include any suitable mathematical models or other relationships stored in the work vehicle configuration database 210 and used, for example, for determining the torque arms or distances as a function of the boom position, implement tilt position, and the chassis angle, where necessary. It should be appreciated that such mathematical models used in accordance with aspects of the present subject matter may generally vary based on differing work vehicle configurations, particularly with respect to differing lift assembly configurations.

Returning back to FIG. 3, the memory 106 of the controller 102 may further include one or more databases for storing data indicative of the weighing conditions for operating the implement 22. For instance, as shown in FIG. 3, the memory 106 includes a weighing conditions database 212 for storing data received from the sensor(s) 60, 62, 64, 66, 128, 130, 132, 134 (FIG. 2) as a load of unknown weight is supported by the implement 22. The term "weight data" may include any suitable data transmitted to the controller 102 from the sensor(s) 60, 62, 64, 66, 128, 130, 132, 134 (FIG. 2) and/or any other suitable source, and stored within the weighing conditions database 212 for subsequent processing and/or analysis to determine the weight of the load being lifted by the implement 22, as will be described in greater detail below. For example, as discussed above, the position sensor 60 (FIG. 4) may provide an input indicative of a boom angle A1 (FIG. 4) relative to a reference position of the boom 24, the position sensor 62 (FIG. 4) may provide an input indicative of a tilt angle A2 (FIG. 4) of the implement 22 (e.g., relative to an axis 24A of the boom 24), and the inclination sensor 64 (FIG. 4) mounted to the chassis 16 may provide an input indicative of an angle A3 (FIG. 4) of the chassis 16 (e.g., relative to flat ground). Further, the speed sensor 66 (FIG. 2) may provide an input indicative of a ground speed of the work vehicle 10. Additionally, the pressure sensors 128, 130 (FIG. 2) may provide inputs indicative of a lift force of the lift cylinders 34 (FIG. 2), and the pressure sensors 132, 134 (FIG. 2) may provide inputs indicative of a tilt force of the tilt cylinders 36.

Additionally, the memory 106 of the controller 102 may include a weight relationships database 214 for storing relationships for determining the weight of the load carried by the implement 22 while accounting for the distance between the implement joint 30 (FIG. 1) and center of gravity of the load. The term "weight relationship data" may include any suitable data transmitted to the controller 102 from the sensor(s) 60, 62, 64, 66, 128, 130, 132, 134 (FIG. 2) and/or any other suitable source, and stored within the weight relationships database 214 for subsequent processing and/or analysis.

Specifically, in one embodiment, the weight relationships database 214 includes one or more algorithms or stored relationships configured to determine a torque about the implement joint 30 (FIG. 4) caused by the tilt force as a function of the sensed tilt force of the tilt cylinder 36 (e.g., the inputs indicative of the tilt force received from the pressure sensor(s) 132, 134 (FIG. 2)). For instance, in one embodiment, a torque caused by the tilt force about the implement joint 30, $T_{Implement\_Joint}$, can be calculated as a function of the sensed tilt force, $F_{Sensed\_Tilt}$, the first torque distance D1 (e.g., as determined based on the monitored parameters), the second torque distance D2 (e.g., as determined based on the monitored parameters), and the third torque distance D3 (e.g., as determined based on the monitored parameters) using the following equation (Equation 1):

$$T_{Implement\_Joint}=F_{Sensed\_Tilt}*((D1*D3)/D2) \quad (1)$$

In addition, the torque caused by the tilt force about the implement joint 30, $T_{Implement\_Joint}$, can also be expressed as a function of a weight of the load, $W_{load}$, and a torque distance $D_{CG}$ from the implement joint 30 to a center of gravity CG1 of the load (e.g. in the horizontal direction X1) using the following equation (Equation 2):

$$T_{Implement\_Joint}=W_{load}*D_{CG} \quad (2)$$

Furthermore, the weight relationships database 214 includes one or more algorithms or stored relationships configured to determine a torque about the boom joint 32 (FIG. 4) caused by the lift force and the tilt force as a function of the sensed lift force of the lift cylinder 34 (e.g., the inputs indicative of the lift forced received from the pressure sensors 128, 130 (FIG. 2) and the sensed tilt force of the tilt cylinder 36 (e.g., the inputs indicative of the tilt force received from the pressure sensor(s) 132, 134 (FIG. 2)). For instance, in one embodiment, a torque caused by the lift and tilt forces about the boom joint 32, $T_{Boom\_Joint}$, can be calculated as a function of the sensed tilt force, $F_{Sensed\_Tilt}$, the fourth torque distance D4 (e.g., as determined based on the monitored parameters), the sensed lift force, $F_{Sensed\_Lift}$, and the fifth torque distance D5 (e.g., as determined based on the monitored parameters) using the following equation (Equation 3):

$$T_{Boom\_Joint}=F_{Sensed\_Tilt}*D4+F_{Sensed\_Lift}*D5 \quad (3)$$

In addition, the torque caused by the load, $T_{Boom\_Joint}$, can also be expressed as a function of the weight of the load, $W_{load}$, the sixth torque distance D6 (e.g., determined based on the monitored parameters), and the torque distance $D_{CG}$ from the implement joint 30 to the center of gravity CG1 of the load using the following equation (Equation 4):

$$T_{Boom\_Joint}=W_{load}*(D6+D_{CG}) \quad (4)$$

Moreover, the weight relationships database 214 includes one or more algorithms or stored relationships configured to determine a torque about the boom joint 32 (FIG. 4) caused by the load. For instance, in one embodiment, a torque about the boom joint 32 caused by the load, $T_{Boom\_Joint}$, can be calculated as a function of weight of the load, $W_{load}$, the sixth torque distance D6 (e.g., determined based on the monitored parameters), and the torque about the implement joint 30, $T_{Implement\_Joint}$, using the following equation (Equation 5):

$$T_{Boom\_Joint}=W_{load}*D6+T_{Implement\_Joint} \quad (5)$$

It should be appreciated that the torque about the implement joint 30, $T_{Implement\_Joint}$, in Equation 5 is a substitute for the product of the weight of the load, $W_{load}$, and the torque distance $D_{CG}$ from the implement joint 30 to the center of gravity CG1 of the load in Equation 4 according to Equation 2.

Additionally, the weight relationships database 214 includes one or more algorithms or stored relationships configured to estimate the weight of the load, $W_{load}$, as a function of the torques about the boom and implement joints. For instance, in one embodiment, the weight of the load, $W_{load}$, can be calculated or estimated as a function of the torque about the boom joint 32 caused by the load, $T_{Boom\_Joint}$, the torque about the implement joint 30, $T_{Implement\_Joint}$, and the sixth torque distance D6 (e.g., determined based on the monitored parameters) using the following equation (Equation 6):

$$W_{load}=(T_{Boom\_Joint}-T_{Implement\_Joint})/D6 \quad (6)$$

It should be appreciated that the controller 102 may be configured to receive inputs from the various sensors while the implement 22 is actively moving the load, or while the implement 22 is "static." As such, the weight relationships database 214 may include any suitable corrections for static or dynamic forces that may be present as would be understood in the art. For instance, any static friction on joints or within the cylinder may be accounted for while the implement 22 is not being moved. Similarly, any viscous torque or inertial torque may be accounted for when the implement 22 is being moved. Further, the weight relationships database 214 may include any suitable corrections for the work vehicle 10 while moving or being static. For example, the weight relationships database 214 may include any suitable corrections for tire pressure fluctuation, vehicle acceleration, or the like.

Similarly, it should be appreciated that the weight relationships database 214 may include any suitable corrections for the weight(s) of the various components of the lift assembly 20 and their respective center(s) of gravity. For instance, in some embodiments, the torque about the implement and/or boom joint(s) 30, 32 is equal to the torque about the implement and/or boom joint(s) 30, 32 caused by the weight of the empty implement 22 at its center of gravity in addition to the torque about the implement and/or boom joint(s) 30, 32 caused by the weight of the load at its center of gravity CG1. As such, in embodiments where the weight and the position of the center of gravity of the empty implement 22 are known and/or stored in the work vehicle configuration database 210, the torque about the implement and/or boom joint(s) 30, 32 caused by the weight of the empty implement 22 at its center of gravity may be accounted for when determining the total torque about the implement and/or boom joint(s) 30, 32.

Further, it should be appreciated that the sensed lift force $F_{Sensed\_Lift}$ and the sensed tilt force $F_{Sensed\_Tilt}$ described above with reference to Equations 1 and 3 can each be calculated as a function of the pressure differential $\Delta P_{Lift}$, $\Delta P_{Tilt}$ between the respective rod-side and cylinder-side pressures of the respective cylinder 34, 36 (e.g., as indicated by the inputs from the pressure sensors 128, 130, 132, 134) and a cross-sectional area $A_{Lift}$, $A_{Tilt}$ of a cylinder side of the respective cylinder 34, 36 using the following equations (Equations 7 and 8):

$$F_{Sensed\_Lift} = \Delta P_{Lift} * A_{Lift} \qquad (7)$$

$$F_{Sensed\_Tilt} = \Delta P_{Tilt} * \Delta P_{Tilt} \qquad (8)$$

It should additionally be appreciated that, when determining the tilt and lift forces, in some embodiments, the pressure sensors 130, 134 providing inputs indicative of the cylinder-side pressures of the cylinders 34, 36 can be used alone to reduce cost. Particularly, as the rod-side pressures of the cylinders 34, 36 may be limited by the hydraulic circuit to relatively small pressures compared to the cylinder-side pressures, the rod-side pressures can be considered as constants when determining the tilt and lift forces, or may be ignored (e.g., considered equal to zero). However, in some embodiments, the pressure sensors 130, 134 providing the inputs indicative of the cylinder-side pressures of the cylinders 34, 36 can be used in conjunction with the pressure sensors 128, 132 providing inputs indicative of the rod-side pressures of the cylinders 34, 36 to increase the accuracy of the sensed tilt and lift forces.

Referring still to FIG. 4, in some embodiments, instructions 216 stored within the memory 106 of the controller 102 may be executed by the processor(s) 104 to implement a weight determination module 218. The weight determination module 218 may generally be configured to collect data from the sensor(s) 60, 62, 64, 128, 130, 132, 134 (FIG. 2) and subsequently determine the weight of the load being carried by the implement 22. For instance, as discussed above, the inputs indicative of the boom angle A1 (FIG. 4) and the tilt angle A2 (FIG. 4) may be used to determine the first, second, third, fourth, and fifth torque distances D1, D2, D3, D4, D5, and further with the input indicative of the chassis angle A3 (FIG. 4) to determine the sixth torque distance D6, using the lookup table(s) and/or models stored in the work vehicle configuration database 210. The further inputs indicative of the lift force of the lift cylinders 34 (FIG. 2) and the tilt force of the tilt cylinders 36 may be used with the determined torque distances D0, D1, D2, D3, D4, D5, D6 in the various equations (e.g., Equations 1-8) stored in the weight relationships database 214 to determine the weight of the load Additionally, in some embodiments, the instructions 216 stored within the memory 106 of the controller 102 may also be executed by the processor(s) 104 to implement a display module 220. The display module 220 may generally be configured to control the operation of the user interface 170 (FIG. 2) to display or otherwise indicate to an operator of the work vehicle 10 the weight of the load estimated by the weight determination module 218. For example, the display module 220 may be configured to control a display screen of the user interface 170 to display the estimated weight of the load being carried by the implement 22.

It should also be appreciated that, in several embodiments, the controller 102 may be configured to include a communications module or interface 222 to allow for the controller 102 to communicate with any of the various other system components described herein. For instance, the controller 102 may, in several embodiments, be configured to receive data or sensor inputs from the sensor(s) 60, 62, 64, 128, 130, 132, 134 (FIG. 2) that are used to detect one or more parameters associated with the operating condition of the work vehicle 10 via any suitable connections with the communications interface 222, such as a wired or wireless connection.

Figure 5:
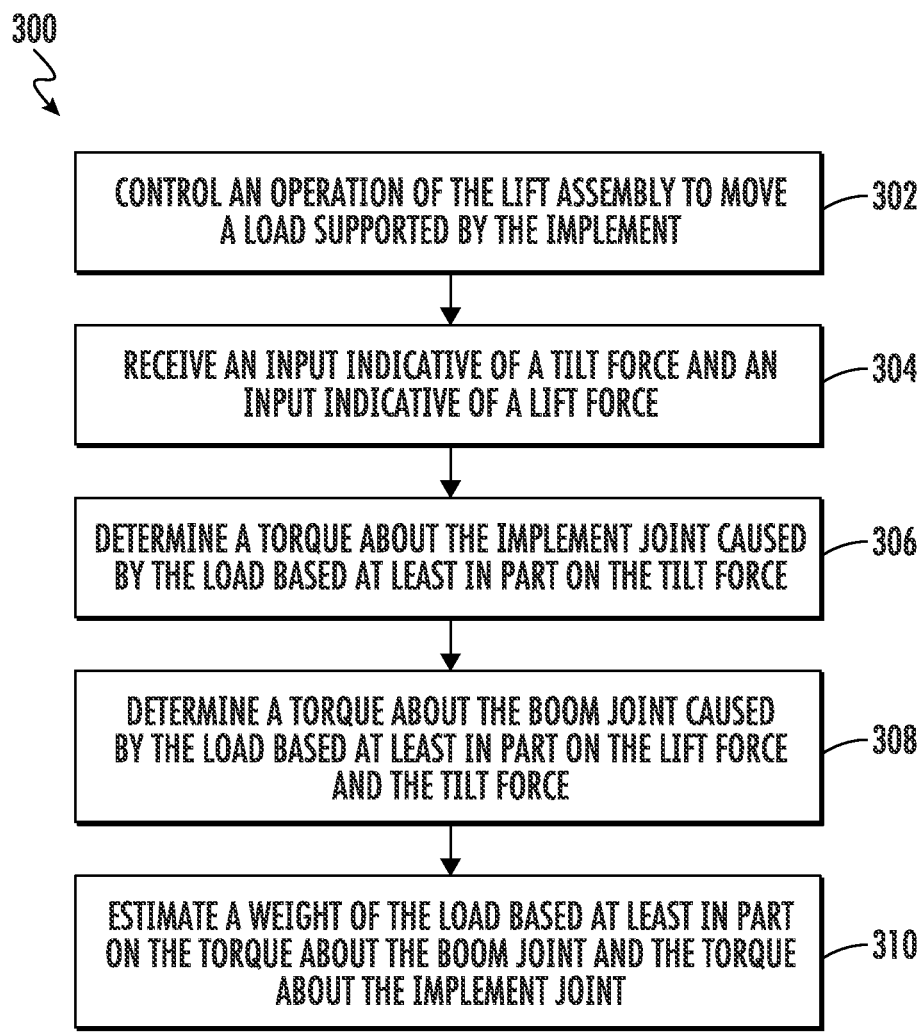
FIG. 5 illustrates a flow diagram of a method for estimating the weight of a load carried by an implement of a work vehicle in accordance with aspects of the present subject matter.

Referring now to FIG. 5, a flow diagram of one embodiment of a method 300 for estimating a weight of a load carried by an implement of a work vehicle is illustrated in accordance with aspects of the present subject matter. In general, the method 300 will be described herein with reference to the work vehicle 10 shown in FIGS. 1 and 4, as well as the various system components shown in FIGS. 2-3. However, it should be appreciated that the disclosed method 300 may be implemented with work vehicles having any other suitable configuration and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include controlling an operation of the lift assembly to move a load supported by the implement. For instance, as described above, the controller 102 may be configured to control an operation of the lift assembly 20 (e.g., operation of one or more of the lift cylinder 34 and the tilt cylinder 36) to move a load supported by the implement 22.

Further, at (304), the method 300 may include receiving an input indicative of a tilt force and an input indicative of a lift force. For example, as described above, the controller 102 may be configured to receive an input indicative of a tilt force from pressure sensors 132, 134 associated with a tilt cylinder 36 configured to pivot the implement 22 relative to the boom 24 about the implement joint 30. Further, the controller 102 may be configured to receive an input indicative of a lift force from pressure sensors 128, 130 associated with a lift cylinder 34 configured to pivot the boom 24 relative to the chassis 16 about the boom joint 32.

At (306), the method 300 may include determining a torque about the implement joint caused by the load based at least in part on the tilt force. For instance, as described above, the controller 102 may be configured to determine a torque about the implement joint 30 caused by the load based at least in part on the tilt force. For example, the controller 102 may use the input indicative of the tilt force from the pressure sensor(s) 132, 134 with the relevant torque distances D1, D2, D3 in one of the equations (e.g., Equation 1) stored in the weighing relationships database 214 of its memory 106 to determine the torque about the implement joint 30 caused by the load based at least in part on the tilt force.

Furthermore, at (308), the method 300 may include determining a torque about the boom joint caused by the load based at least in part on the lift force and the tilt force. For instance, as indicated above, the controller 102 may be configured to determine a torque about the boom joint 32 caused by the load based at least in part on the lift force and the tilt force. For example, the controller 102 may use the input indicative of the tilt force from the pressure sensor(s) 132, 134 with the relevant torque distance D4 and the input indicative of the lift force from the pressure sensor(s) 128, 130 with the relevant torque distance D5 in one of the equations (e.g., Equation 3) stored in the weighing relationships database 214 of its memory 106 to determine the torque about the boom joint 32 caused by the load based at least in part on the lift force and the tilt force.

Additionally, at (310), the method 300 may include estimating a weight of the load based at least in part on the torque about the boom joint and the torque about the implement joint. For instance, as described above, the controller 102 may be configured to estimate a weight of the load based at least in part on the torque about the boom joint and the torque about the implement joint. For example, the controller 102 may use the determined torque about the boom joint and the determined torque about the implement joint with the relevant torque distance D6 in one of the equations (e.g., Equation 6) stored in the weighing relationships database 214 of its memory 106 to estimate the weight of the load based at least in part on the torque about the boom joint and the torque about the implement joint.

It is to be understood that the steps of the method 300 are performed by the computing system 102 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 102 described herein, such as the method 300, is implemented in software code or instructions which are tangibly stored on a tangible computer readable medium. The computing system 102 loads the software code or instructions via a direct interface with the computer readable medium or via a wired and/or wireless network. Upon loading and executing such software code or instructions by the computing system 102, the computing system 102 may perform any of the functionality of the computing system 102 described herein, including any steps of the method 300 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating load weights for a work vehicle, the work vehicle including a lift assembly and a chassis, the lift assembly including a boom pivotably coupled to the chassis at a boom joint and an implement pivotably coupled to the boom at an implement joint, the method comprising:
   controlling, with one or more computing devices, an operation of the lift assembly to move a load supported by the implement;
   receiving, with the one or more computing devices, an input indicative of a tilt force associated with a tilt cylinder configured to pivot the implement relative to the boom about the implement joint, and an input indicative of a lift force associated with a lift cylinder configured to pivot the boom relative to the chassis about the boom joint;
   determining, with the one or more computing devices, a torque about the implement joint caused by the load based at least in part on the tilt force;
   determining, with the one or more computing devices, a torque about the boom joint caused by the load based at least in part on the lift force and the tilt force; and
   estimating, with the one or more computing devices, a weight of the load based at least in part on the torque about the boom joint and the torque about the implement joint.

2. The method of claim 1, wherein the tilt cylinder is coupled to the boom at a tilt cylinder joint and is coupled to the implement via a bellcrank assembly.

3. The method of claim 2, further comprising determining a plurality of torque distances associated with the bellcrank assembly provided between the implement and the tilt cylinder.

4. The method of claim 3, wherein determining the torque about the implement joint comprises determining the torque about the implement joint as a function of the tilt force and the plurality of torque distances.

5. The method of claim 1, wherein the lift cylinder is coupled to the chassis at a lift cylinder joint,
   the method further comprising determining a first torque distance between the tilt cylinder and the boom joint and determining a second torque distance between the lift cylinder and the boom joint.

6. The method of claim 5, wherein determining the torque about the boom joint comprises determining the torque about the boom joint as a function of the tilt force, the lift force, and the first and second torque distances.

7. The method of claim 1, further comprising receiving an input indicative of an angle of the implement, and an input indicative of an angle of the boom,
wherein determining the torque about the implement joint comprises determining the torque about the implement joint based at least in part on the angle of the implement, the angle of the boom, and the tilt force, and
wherein determining the torque about the boom joint comprises determining the torque about the boom joint based at least in part on the angle of the implement, the angle of the boom, the lift force, and the tilt force.

8. The method of claim 1, wherein estimating the weight of the load comprises estimating the weight of the load as a function of the torque about the boom joint, the torque about the implement joint, and a horizontal distance defined between the boom joint and the implement joint.

9. The method of claim 1, wherein each of the tilt cylinder and the lift cylinder has a cylinder side and a rod side, the input indicative of the tilt force being a sensed pressure of the cylinder side of the tilt cylinder and the input indicative of the lift force being a sensed pressure of the cylinder side of the lift cylinder.

10. The method of claim 1, further comprising controlling, with the one or more computing devices, a user interface to display the estimated weight of the load.

11. The method of claim 1, wherein a center of gravity of the load is spaced apart from the implement joint in at least a horizontal direction.

12. A system for estimating the weight of loads carried by implements associated with work vehicles, the system comprising:
a work vehicle including a chassis;
a lift assembly including a boom pivotably coupled to the chassis at a boom joint and an implement pivotably coupled to the boom at an implement joint; and
a controller including a processor and associated memory, the memory storing instructions, that when implemented by the processor, configure the controller to:
control an operation of the lift assembly to move a load supported by the implement;
receive an input indicative of a tilt force associated with a tilt cylinder configured to pivot the implement relative to the boom about the implement joint, and an input indicative of a lift force associated with a lift cylinder configured to pivot the boom relative to the chassis about the boom joint;
determine a torque about the implement joint caused by the load based at least in part on the tilt force;
determine a torque about the boom joint caused by the load based at least in part on the lift force and the tilt force; and
estimate a weight of the load based at least in part on the torque about the boom joint and the torque about the implement joint.

13. The system of claim 12, wherein the tilt cylinder is coupled to the boom at a tilt cylinder joint and is coupled to the implement via a bellcrank assembly.

14. The system of claim 13, where the controller is further configured to determine a plurality of torque distances associated with the bellcrank assembly provided between the implement and the tilt cylinder.

15. The system of claim 14, wherein determining the torque about the implement joint comprises determining the torque about the implement joint as a function of the tilt force and the plurality of torque distances.

16. The system of claim 12, wherein the lift cylinder is coupled to the chassis at a lift cylinder joint,
wherein the controller is further configured to determine a first torque distance between the tilt cylinder and the boom joint and determining a second torque distance between the lift cylinder and the boom joint.

17. The system of claim 16, wherein determining the torque about the boom joint comprises determining the torque about the boom joint as a function of the tilt force, the lift force, and the first and second torque distances.

18. The system of claim 12, wherein the controller is further configured to receive an input indicative of an angle of the implement, and an input indicative of an angle of the boom,
wherein determining the torque about the implement joint comprises determining the torque about the implement joint based at least in part on the angle of the implement, the angle of the boom, and the tilt force, and
wherein determining the torque about the boom joint comprises determining the torque about the boom joint based at least in part on the angle of the implement, the angle of the boom, the lift force, and the tilt force.

19. The system of claim 12, wherein estimating the weight of the load comprises estimating the weight of the load as a function of the torque about the boom joint, the torque about the implement joint, and a horizontal distance defined between the boom joint and the implement joint.

20. The system of claim 12, wherein each of the tilt cylinder and the lift cylinder has a cylinder side and a rod side, the input indicative of the tilt force being a sensed pressure of the cylinder side of the tilt cylinder and the input indicative of the lift force being a sensed pressure of the cylinder side of the lift cylinder.

* * * * *